United States Patent
Messing et al.

(10) Patent No.: US 11,441,538 B2
(45) Date of Patent: Sep. 13, 2022

(54) WIND TURBINE AND METHOD FOR CONTROLLING THE WIND TURBINE USING AN OPERATING CHARACTERISTIC CURVE

(71) Applicant: Wobben Properties GmbH, Aurich (DE)

(72) Inventors: Ralf Messing, Aurich (DE); Mustafa Onur Kimilli, Munich (DE); Frank Zimmermann, Emden (DE); Maik Nitsche, Schortens (DE); Matthias Giesler, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/962,107

(22) PCT Filed: Jan. 14, 2019

(86) PCT No.: PCT/EP2019/050788
§ 371 (c)(1),
(2) Date: Jul. 14, 2020

(87) PCT Pub. No.: WO2019/138105
PCT Pub. Date: Jul. 18, 2019

(65) Prior Publication Data
US 2020/0340448 A1    Oct. 29, 2020

(30) Foreign Application Priority Data
Jan. 15, 2018  (DE) .................... 10 2018 100 726.4

(51) Int. Cl.
*F03D 7/02*    (2006.01)

(52) U.S. Cl.
CPC ......... *F03D 7/0276* (2013.01); *F03D 7/0224* (2013.01)

(58) Field of Classification Search
None
See application file for complete search history.

(56) References Cited

U.S. PATENT DOCUMENTS

| 6,891,280 B2 | 5/2005 | Siegfriedsen |
| 2009/0292397 A1 | 11/2009 | Bjerge et al. |
| (Continued) | | |

FOREIGN PATENT DOCUMENTS

| EP | 2113659 A2 | 11/2009 |
| EP | 2123906 A1 | 11/2009 |
| WO | 01/77524 A1 | 10/2001 |

*Primary Examiner* — Tulsidas C Patel
*Assistant Examiner* — S. Mikailoff
(74) *Attorney, Agent, or Firm* — Seed IP Law Group LLP (57) ABSTRACT

A wind turbine includes a tower, an aerodynamic rotor operable at a variable rotor speed and having a plurality of rotor blades each having an adjustable rotor blade setting angle and a generator for generating an electrical output power. An operating characteristic curve is prespecified for operating the wind turbine. The operating characteristic curve indicates a relationship between the rotor speed and the output power. A controller is provided, which sets the output power in accordance with the operating characteristic curve depending on the rotor speed. The the operating characteristic curve has a starting rotation speed to which the rotor speed increases as soon as the wind turbine starts when a sufficient wind speed is reached. The starting rotation speed is defined depending on a tower natural frequency of the wind turbine and/or depending on a detected turbulence measure of the prevailing wind.

20 Claims, 3 Drawing Sheets

(56) References Cited

U.S. PATENT DOCUMENTS

| | | | |
|---|---|---|---|
| 2012/0091714 A1* | 4/2012 | Wittekind | F03D 7/0276 |
| | | | 290/44 |
| 2013/0177418 A1* | 7/2013 | Hansen | F03D 7/042 |
| | | | 416/1 |
| 2014/0327243 A1 | 11/2014 | Demtröder | |
| 2018/0245568 A1* | 8/2018 | Pedersen | F03D 7/042 |
| 2020/0340448 A1* | 10/2020 | Messing | F03D 7/0276 |

* cited by examiner

--Prior Art--

WIND TURBINE AND METHOD FOR CONTROLLING THE WIND TURBINE USING AN OPERATING CHARACTERISTIC CURVE

BACKGROUND

Technical Field

The present invention relates to a method for controlling a wind turbine, and the present invention also relates to a corresponding wind turbine.

Description of the Related Art

It is known that the rotation of an aerodynamic rotor can excite a natural frequency of a wind turbine or a natural frequency of a tower of the wind turbine depending on the rotor speed. To remedy this, the prior art discloses rapidly passing through corresponding rotor speeds which can excite a natural frequency of this kind of the tower or of the wind turbine.

A measure of this kind requires precise knowledge of the corresponding natural frequency or of the rotation speed which excites this natural frequency, said rotation speed being referred to as the critical rotation speed here, and then makes it necessary to distinguish in each case between operation below this critical rotation speed and operation above this critical rotation speed. In addition, a poor degree of efficiency has to be accepted particularly when passing through the critical rotation speed range. In particular, it may be necessary, in order to pass through a critical rotation speed range of this kind, to reduce the output power and therefore the yield at that time.

The German Patent and Trademark Office researched the following prior art in the priority application for the present application: US 2009/0 292 397 A1, US 2014/0 327 243 A1, EP 2 113 659 A2 and WO 2001/77 524 A1.

BRIEF SUMMARY

Reducing oscillation excitation, particularly of the tower of the wind turbine, by the rotor is provided with as high a yield as possible.

A wind turbine is provided. A wind turbine of this kind has a tower and an aerodynamic rotor which can be operated at a variable rotor speed. The rotor speed can also simply be referred to as the rotation speed. The aerodynamic rotor has a plurality of rotor blades which each have an adjustable rotor blade setting angle. Therefore, the rotor blades can be adjusted in respect of their angle of attack in relation to the wind.

A generator for generating an electrical output power is also provided, and the generator is driven by the aerodynamic rotor during operation. A transmission-free design is preferably provided, in which the aerodynamic rotor is directly coupled to an electrodynamic rotor of the generator, so that the aerodynamic and the electrodynamic rotor rotate at the same rotation speed.

An operating characteristic curve is prespecified for operating the wind turbine, which operating characteristic curve indicates a relationship between the rotor speed and the output power. To this end, the wind turbine has a controller which sets the output power in accordance with the operating characteristic curve depending on the rotor speed. A controller of this kind can be provided as a control module or, for example, as a process computer in the wind turbine. The operating characteristic curve is preferably stored in the controller too.

The operating characteristic curve additionally has a starting rotation speed to which the rotor speed increases as soon as the wind turbine starts when a sufficient wind speed is reached. Therefore, if the wind speed is not yet sufficient, the wind turbine is not operated. However, according to one embodiment, if the wind turbine is not operated, the rotor may be in a coasting mode in which the rotor rotates, rotor always referring to the aerodynamic rotor here, however without an output power being generated in the wind turbine as a result. If there is enough wind, that is to say if the wind speed is sufficiently high, the wind turbine is started at a starting rotation speed. Starting the wind turbine in this way means that said wind turbine is then controlled by an operating controller and in the process generates the output power by means of the generator. In this case, azimuth adjustment of the wind turbine particularly takes place during operation and the rotor blades are particularly also set in respect of their rotor blade setting angle such that they can draw power from the wind in as optimum a manner as possible.

To this end, it is then proposed that the starting rotation speed is defined depending on a tower natural frequency of the wind turbine and in addition or as an alternative depending on a detected turbulence measure of the prevailing wind.

In particular, selecting the starting rotation speed depending on the tower natural frequency creates the option of selecting the starting rotation speed to be so high that the tower natural frequency is not excited since the starting rotation speed is specifically selected to be so high that it lies above a rotation speed which could excite the tower natural frequency. Accordingly, it is proposed to leave out a corresponding rotation speed range below a rotation speed of this kind which excites the tower natural frequency.

It should be noted here that this does not mean that the wind turbine starts only when the wind is at an intensity at which the rotor speed lies above the rotation speed which excites the tower natural frequency in accordance with a customary operating characteristic curve. Rather, it is proposed, in the starting range here, to start when the wind is, as far as possible, as weak as before, but in so doing to select a higher rotation speed than otherwise.

It may be the case that a slightly poorer degree of efficiency is achieved at the specific operating point of this higher starting rotation speed as a result. However, this can be balanced out by the improved operation overall. Even if the starting wind speed at which said wind turbine can be started is slightly increased as a result, an increased yield can nevertheless be established on the whole. In particular, the unfavorable situation of passing through a critical rotation speed range, which specifically can excite the tower natural frequency, can be avoided.

It has also been found that tower loading can occur not only due to precise excitation of the tower natural frequency, but rather that specific wind conditions can also amplify tower loadings of this kind. For example, a comparatively slowly rotating aerodynamic rotor can have such a blade pass frequency that this can lead to tower loading due to the continuous blade passes past the tower. If the wind is then substantially uniform and stationary, loading of this kind may possibly be tolerated. However, it has been found that the loading can be further amplified due to a high turbulence of the wind, that is to say particularly a high level of gustiness of the wind. To this end, it has now been found that increasing the starting rotation speed can reduce the total loading.

The starting rotation speed is particularly preferably defined depending on the tower natural frequency and depending on a detected turbulence measure. Therefore, the starting rotation speed can be raised above the critical rotation speed. Here, the critical rotation speed refers, in principle, to the rotation speed which excites the natural frequency of the tower. The starting rotation speed can additionally be raised yet further, in order to achieve a greater distance from the critical rotation speed, depending on how turbulent the wind is, that is to say particularly how gusty it is. In particular, it is proposed here that the more turbulent the wind is, the further above the critical rotation speed the starting rotation speed lies.

It is preferably proposed that a turbulence intensity is considered to be a turbulence measure.

The turbulence of the wind can be described by the turbulence intensity TI:

$$TI = \frac{\sigma_u}{\overline{U}}. \quad [\text{Eq. 1}]$$

The standard deviation $\sigma_u$ is defined as follows:

$$\sigma_u = \sqrt{\frac{1}{T}\int_0^T (u - \overline{U})^2 dt}, \quad [\text{Eq. 2}]$$

with the wind speed $\overline{U}$ averaged over the time period T:

$$\overline{U} = \frac{1}{T}\int_0^T u\, dt. \quad [\text{Eq. 3}]$$

In order to describe non-stationary flows u, the averaged speed is usually superimposed by the fluctuation ũ:

$$u = \overline{U} + \tilde{u} \quad [\text{Eq. 4}]$$

The turbulence intensity therefore reflects the standard deviation of the wind speed with respect to the wind speed averaged over a relatively long period of time, for example 10 minutes. A measure of the level of intensity of the superimposed fluctuation with respect to the wind speed is indicated in this way. In this respect, this turbulence intensity is also a measure of the intensity of the fluctuations in the wind which can constitute additional loading of the wind turbine. To this end, it has been found that relief of loading in the event of turbulent wind can already be achieved in the region of the critical rotation speed if the rotation speed lies at a somewhat greater distance from the critical rotation speed. Prespecifying a correspondingly high starting rotation speed results in all operation of the wind turbine lying above this critical rotation speed, specifically at a correspondingly sufficient distance. However, selecting the distance of the rotation speed from the critical rotation speed to be unnecessarily large can be avoided by taking into account the turbulence intensity.

According to one embodiment, it is proposed that a starting output power is associated with the starting rotation speed by means of the operating characteristic curve. To this end, it is then proposed that the starting output power is initially set when the wind turbine is started, until the wind speed increases further. This can be carried out, in particular, such that the wind speed is detected and the wind speed at which an operating point of this kind with the starting rotation speed and the starting output power is produced given a corresponding rotor blade setting angle is predetermined. If this wind speed is then present, the wind turbine can be started and the turbine can speed up directly to this predetermined operating point.

According to one refinement, it is therefore also proposed that a starting wind speed or a starting torque is defined and, when the wind speed increases to the starting wind speed or when a rotor torque increases to the starting torque, the wind turbine starts, increases to the starting rotation speed by the rotor speed and the starting output power is set.

The starting rotation speed is preferably defined by way of the operating characteristic curve being defined in a corresponding manner. The starting rotation speed is located substantially at the start of the operating characteristic curve. Therefore, descriptively speaking, the operating characteristic curve has some operating points which are each defined as value pairs of output power and rotor speed. One of these is the operating point which is defined by the starting rotation speed as the rotor speed and an output power, in particular the starting output power. If a starting rotation speed is then defined or changed, a corresponding operating point on the operating characteristic curve is prespecified and therefore the operating characteristic curve is defined or changed.

Instead of defining the operating characteristic curve, that is to say prespecifying said operating characteristic curve for example point for point or by means of basic data, consideration is also given to storing a plurality of predetermined operating characteristic curves and then selecting, from amongst these plurality of predetermined operating characteristic curves, the operating characteristic curve which has the desired starting rotation speed. Here, interpolation may optionally be carried out between two operating characteristic curves if the desired starting rotation speed does not lie precisely on one of the predetermined operating characteristic curves.

The turbulence measure is preferably a measure of how turbulent the prevailing wind is, wherein the more turbulent the wind is, the greater the turbulence measure. To this end, it is also proposed that the greater the turbulence measure, the greater the starting rotation speed is selected to be, that is to say the greater said starting rotation speed is defined to be. In particular, the turbulence intensity explained above is a turbulence measure of this kind which is greater the more turbulent the prevailing wind is. According to this proposal of selecting the starting rotation speed to be greater the greater the turbulence measure is, the more turbulent the wind is, the greater is the distance from the critical rotation speed achieved. Therefore, both a critical rotation speed can be avoided and at the same time excessive loading due to a rotor speed in the vicinity of the critical rotation speed can be avoided in a simple manner by way of defining the starting rotation speed.

Therefore, it is preferably also proposed that the starting rotation speed is selected such that it lies above a rotor speed which excites the tower natural frequency. The advantages of this proposal have already been explained, in particular it can be achieved as a result from the outset that the rotor speed lies, in principle, only above a rotation speed which excites the tower natural frequency and therefore processes for passing through a critical rotation speed can be avoided.

In particular, the starting rotation speed is selected such that its associated blade pass frequency lies above the tower natural frequency. In particular, it is proposed that its blade pass frequency lies at least 5% above the tower natural frequency. By selecting this 5% as the minimum distance, excitation of the tower natural frequency can be avoided with hardly any expected losses in yield at the same time.

In this case, the blade pass frequency is the frequency at which the rotor blades pass in front of the tower. Therefore, if the rotor rotates, for example, at a rotation speed of 6 revolutions per minute, the rotor therefore rotates once in 10 seconds. However, in a rotor with 3 rotor blades, all of the rotor blades pass the tower once in these 10 seconds, so that the blade pass frequency is not 0.1 Hertz, but rather 0.3 Hertz. Therefore, it is proposed to take into account, specifically, this blade pass frequency and to select a starting rotation speed such that this blade pass frequency lies above the tower natural frequency. Therefore, a safer value for the starting rotation speed can be found and then correspondingly set in a simple manner if the tower natural frequency is known.

According to one embodiment, it is proposed that a starting rotor blade setting angle is associated with the starting rotation speed. Therefore, it has been found that a changed starting rotation speed can lead to aerodynamic changes in comparison to a different starting rotation speed given the same wind speed. To this end, it is proposed to take this into account by an adjusted starting rotor blade setting angle. As a result, good aerodynamic conditions can be created given these aerodynamic conditions which are changed by the changed starting rotation speed.

In particular, it is proposed that the greater the starting rotation speed is selected to be, the greater the starting rotor blade setting angle is selected to be. To this end, it is proposed in particular that the starting rotor blade setting angle is also changed, specifically is prespecified in a changed manner in particular, each time the starting rotation speed is changed. In particular, it is proposed here to define a starting operating point which is defined by the starting rotation speed, the starting output power and the starting rotor blade setting angle. Therefore, optimum starting conditions can be created which can prevent the critical rotation speed, can prevent excessive loading due to turbulence phenomena in the vicinity of the critical rotation speed and at the same time can create as high a yield as possible.

In particular, the so-called axial induction, that is to say the deceleration of the air in the rotor swept area, can be reduced again by an increased starting rotor blade setting angle of this kind in order to again at least partially compensate for the induction by raising the starting rotation speed in this way. The increased induction can lead to more inefficient power conversion at the rotor blade by increasing the starting rotor speed, depending on the rotor blade design. If, for example, the rotor blade was operated at the Betz optimum for axial induction at ⅓ before increasing the starting rotation speed, the increased starting rotation speed then leads to the induction being raised above a value of ⅓ and therefore moving away from the optimum. Increasing the starting rotor blade setting angle then leads to the induction decreasing again and moving back toward the optimum.

According to one refinement, it is proposed that a tip-speed ratio which is established at the starting rotation speed is selected depending on the starting rotation speed. The wind turbine is started at a specific wind speed and in this case starts at the intended starting rotation speed. For this purpose, it is proposed to select a tip-speed ratio for the aerodynamic situation which is present at that time. The tip-speed ratio is the ratio of the peripheral speed of the aerodynamic rotor, that is to say at its blade tips, with respect to the prevailing wind speed. The tip-speed ratio is an important characteristic variable for the aerodynamic situation and it is therefore proposed to set or at least influence said aerodynamic situation in an expedient manner by means of advantageously selecting the tip-speed ratio.

If the starting rotation speed is prespecified, the tip-speed ratio can be set by means of the wind at which this starting rotation speed is provided. However, consideration is also given to influencing the tip-speed ratio by way of the starting rotation speed, among other things. For example, consideration is given to a rotation speed range being selected for the starting rotation speed depending on the tower natural frequency and/or the detected turbulence measure. Further setting can then be performed again within this range, by means of which further setting the tip-speed ratio can be set.

In addition or additionally, the tip-speed ratio is preferably selected depending on a starting rotor blade setting angle. As a result, a suitable tip-speed ratio can additionally be matched to the rotor blade setting angle set in order to thereby create a particularly good aerodynamic situation even in the case of starting conditions which are changed in this way.

With preference, the greater the starting rotation speed is selected to be, the greater the tip-speed ratio is selected to be. In addition or as an alternative, the greater the starting rotor blade setting angle is selected to be, the greater said tip-speed ratio is selected to be. In particular, it has been found here that a high tip-speed ratio can lead to good aerodynamic operation at a high initial rotation speed and/or a large initial rotor blade setting angle.

According to one refinement, it is proposed that the operating rotation speed during operation and in addition or as an alternative in a coasting mode is adjusted depending on the turbulence measure in order to set the starting rotation speed in this way.

It has been found here that setting a starting rotation speed not only affects the starting process but also the situation when the wind turbine is stopped again on account of the wind subsiding. In this case, it has been found in particular that the wind properties, in particular a turbulence measure, that is to say in particular a turbulence intensity, may have changed since the last starting process and therefore since the starting rotation speed selected last.

In this case, the wind turbine itself can often readily identify changed conditions of this kind during operation. In particular, said wind turbine can identify this by evaluating the rotor speed, the electrical output power generated and the rotor blade setting angle set. If it is then identified in the process that the wind conditions differ from those at which said wind turbine was last started, the starting rotation speed can also be matched to these changed conditions.

One variant is to carry out a corresponding operating characteristic curve selection for this purpose. If the operating characteristic curve is changed during operation, consideration is given to not controlling a transition of this kind suddenly, but rather by means of a transition function. Consideration is also given to changing only one characteristic curve segment of the operating characteristic curve, specifically one which is situated very close to the starting rotation speed and in which the wind turbine is not currently operated. In other words, a segment of the operating characteristic curve which lies below the current operating point can be changed virtually readily during operation since it has no effect at that time. If the current operating point then drops to this changed characteristic curve range, this changed characteristic curve range can then adjust the operating point in the direction of the starting rotation speed changed in this way.

Consideration is also given to adapting the operating rotation speed during operation. As a result, the wind turbine can be prepared for an imminent drop to the starting rotation speed. The starting rotation speed can also be changed in the process.

Adapting the operating rotation speed and/or operating characteristic curve in a coasting mode has the particular advantage that information about the wind situation is already present in a coasting mode of this kind and can be taken into account as a result.

Therefore, it is preferably also proposed to detect the turbulence measure from an operating behavior of the wind turbine. In so doing, conclusions can be drawn about an average wind speed in particular depending on the average rotation speed, the average torque or the average output power and the rotor blade setting angle set. In particular, conclusions can be drawn about the fluctuation which is superimposed on the average wind speed, that is to say the averaged wind speed, from fluctuations in the rotation speed and the output power. Furthermore, the turbulence intensity can then be determined in the manner described above, particularly in accordance with equation Eq. 1.

A method is provided. This method for controlling a wind turbine uses a wind turbine which has a tower and an aerodynamic rotor, wherein the aerodynamic rotor can be operated at a variable rotor speed and has a plurality of rotor blades, each being provided with an adjustable rotor blade setting angle, that is to say which can be set in respect of their rotor blade setting angle. The wind turbine also has a generator for generating an electrical output power.

According to the method, it is proposed to operate the wind turbine using a prespecified operating characteristic curve. This operating characteristic curve specifies a relationship between the rotor speed and the output power. Furthermore, it is proposed to set the output power in accordance with the operating characteristic curve depending on the rotor speed. In this case, provision is made for the operating characteristic curve to have a starting rotation speed to which the rotor speed increases as soon as the wind turbine starts when a sufficient wind speed is reached. According to the method, it is therefore proposed to use or to create an operating characteristic curve of this kind. In the process, the starting rotation speed is defined depending on a tower natural frequency of the wind turbine. In addition or as an alternative, it is proposed that the starting rotation speed is defined depending on a detected turbulence measure of the prevailing wind, in particular depending on a turbulence intensity.

In particular, it is proposed that a method of this kind operates in the manner as has been explained according to an above-described embodiment of a wind turbine.

A method of this kind preferably uses a wind turbine according to at least one above-described embodiment.

BRIEF DESCRIPTION OF THE SEVERAL VIEWS OF THE DRAWINGS

The invention will be explained in more detail below on the basis of exemplary embodiments by way of example with reference to the accompanying figures.

DETAILED DESCRIPTION

Figure 1:
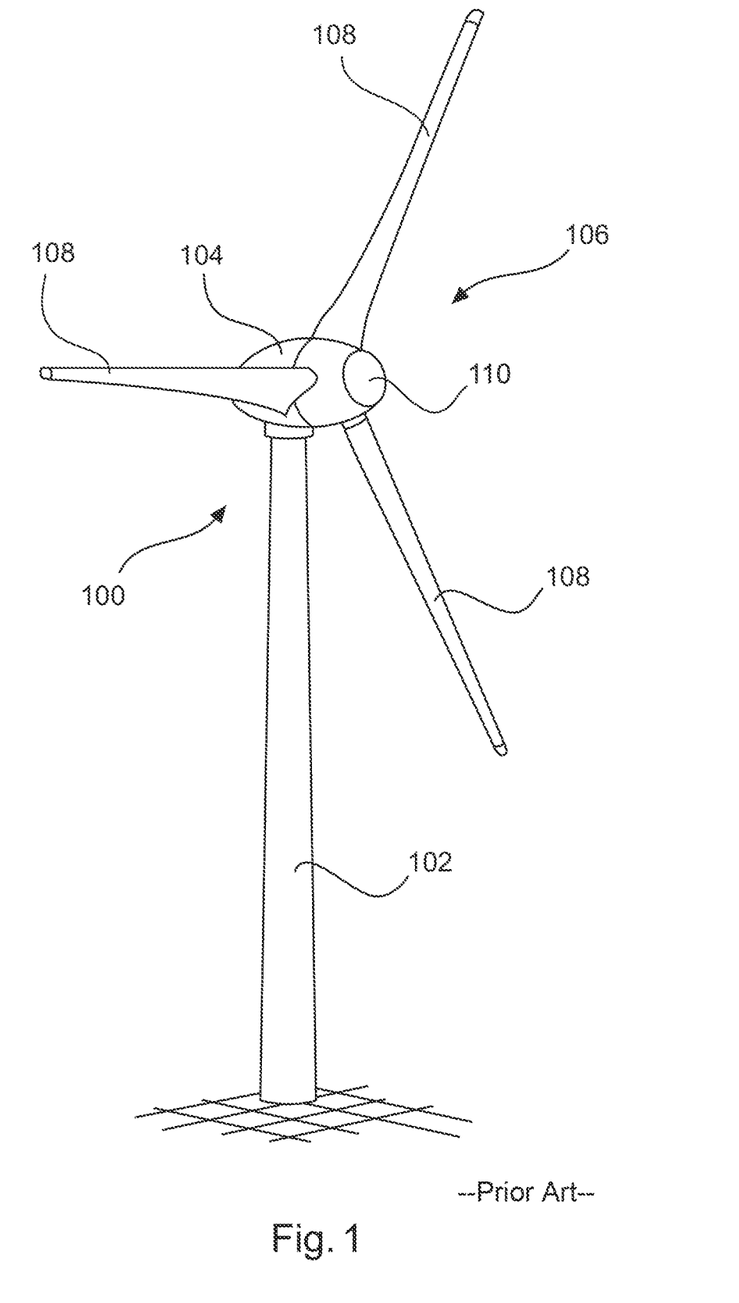
FIG. 1 shows a schematic illustration of a wind turbine.

FIG. 1 shows a wind turbine 100 comprising a tower 102 and a nacelle 104. A rotor 106 comprising three rotor blades 108 and a spinner 110 is arranged on the nacelle 104. The rotor 106 is set in rotary motion by the wind during operation and in this way drives a generator in the nacelle 104.

Figure 2:
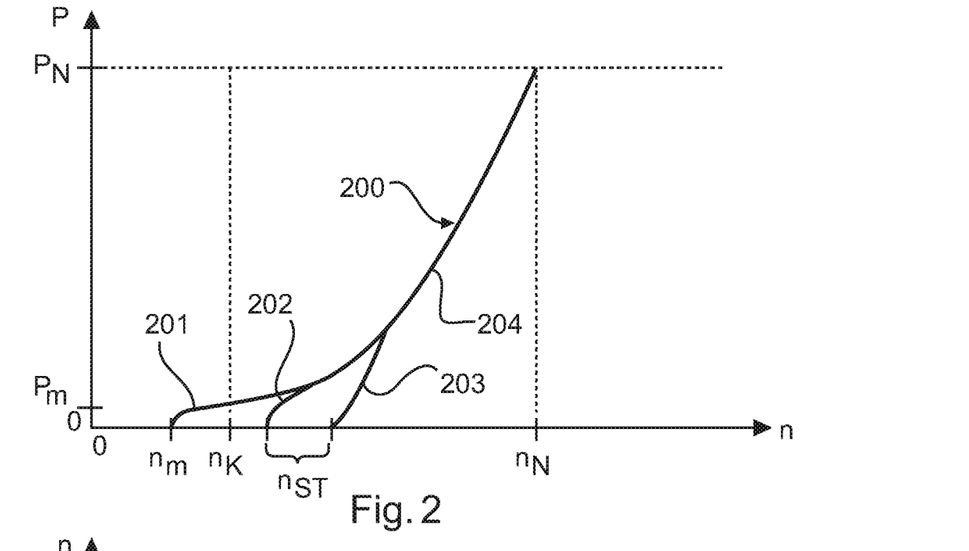
FIG. 2 shows various operating characteristic curves with different starting rotation speeds.

FIG. 2 shows an operating characteristic curve 200 which shows a power P as a function of the rotation speed n. The power P is standardized to nominal power $P_N$ and the rotation speed n is standardized to its nominal rotation speed $n_N$ in the graph.

In addition, a critical rotation speed $n_K$ is marked in the graph of FIG. 2. This critical rotation speed $n_K$ is a rotation speed which would excite a tower natural frequency. For example, this critical rotation speed $n_K$ can be that rotation speed at which a blade pass frequency is established for a wind turbine with three rotor blades, as is shown in FIG. 1, in accordance with the natural frequency of the tower of the wind turbine.

In FIG. 2, the operating characteristic curve 200 has three variations which accordingly lead to three different characteristic curve segments 201 to 203. In this case, the first characteristic curve segment 201 shows a variation in which the critical rotation speed $n_K$ is not avoided. Therefore, in this first characteristic curve segment 201, the wind turbine starts at the minimum rotation speed $n_m$ which constitutes a starting rotation speed in this respect. It can be seen that, according to this operating characteristic curve with the first characteristic curve segment 201, the rotation speed has this value of the minimum rotation speed $n_m$ during starting, wherein the power initially increases to the minimum power $P_m$ at the start, that is to say when the wind is still weak. Said minimum power is the power which has to be generated at least expediently by the wind turbine or by its generator so that starting of the wind turbine is actually expedient.

As the wind speed rises, the rotation speed and therefore also the power then also increase, wherein the critical speed $n_K$ is then achieved in the interim. Excitation of the natural frequency of the tower of the wind turbine can then occur, and this excitation can lead to high loading of the wind turbine.

In order to avoid this, it is proposed to select a starting rotation speed $n_{ST}$ which lies above the critical rotation speed $n_K$. Owing to this solution, the critical rotation speed $n_K$ therefore does not need to be passed through, as proposed in some other methods, but rather starting is just implemented at a higher rotation speed.

Two options for this are illustrated in FIG. 2. According to the second characteristic curve segment 202, a solution is proposed here in which the starting rotation speed $n_{ST}$ is only slightly higher than the critical rotation speed $n_K$.

However, the wind turbine also starts substantially at the minimum power $P_m$ according to this second characteristic curve segment 202, which is likewise part of the operating characteristic curve 200. To this end, substantially only a different starting rotation speed which is, specifically, higher than the minimum rotation speed $n_m$ is selected. If the wind speed then increases, the rotation speed also increases there and in the process the operating point, which is determined by the respective power value and rotation speed value here, moves to the main segment 204 of the operating characteristic curve 200, in which main segment the three characteristic curve segments 201 to 203 merge.

In addition, it is now proposed that it is also further possible to take into consideration the level of the turbulence of the wind. To this end, a turbulence intensity is calculated in particular and if said turbulence intensity is high, it is proposed to select a yet further distance of the starting rotation speed $n_{ST}$ from the critical rotation speed $n_K$ than is the case in the second characteristic curve segment 202. Accordingly, the third characteristic curve segment 203 is proposed given a high turbulence intensity. The wind turbine initially starts at a power value approximately at the level of the minimum power $P_m$ in said third characteristic curve segment too. If the wind speed increases further, the operating point is adjusted to the main segment 204 of the operating characteristic curve 200 here too. Therefore, the third characteristic curve segment 203 creates a greater distance from the critical rotation speed and as a result can prevent additional loading due to a high turbulence intensity.

Figure 3:
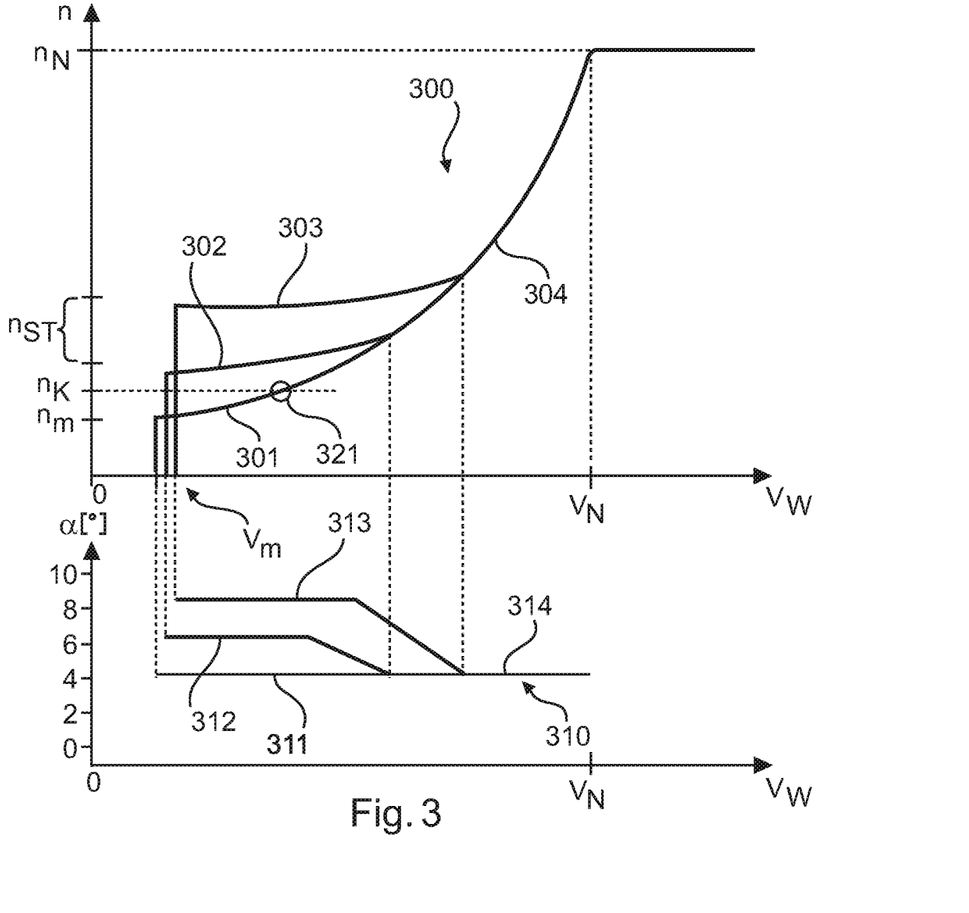
FIG. 3 shows various wind speed-dependent rotation speed profiles and associated blade setting angles.

FIG. 3 exhibits a combined graph, specifically the illustration of a rotation speed profile n as a function of a wind speed $V_W$. The lower region of this graph shows associated blade setting angles α.

FIG. 3 therefore shows, in the upper section, a rotation speed characteristic curve 300 which is basically associated with the operating characteristic curve 200 of FIG. 2, wherein it should of course be noted that the illustrations are schematic. Accordingly, this rotation speed characteristic curve 300 also has a first to third characteristic curve segment 301 to 303 which basically belong to the first to third characteristic curve segment 201 to 203 of FIG. 2 or can be associated with said characteristic curve segments in the same order. The rotation speed characteristic curve 300 also has a main segment 304 in which the rotation speed characteristic curve 300 for all three variants is then the same.

Moreover, the wind speed $V_W$ is standardized to the nominal wind speed $V_N$ and the rotation speed n is standardized to its nominal rotation speed $n_N$ here too. The blade setting angles illustrated in the lower section are indicated, by way of example, by angular degrees which can also have other values.

Therefore, the first characteristic curve segment 301 starts at a low wind speed $V_m$ and is then raised to the minimum rotation speed $n_m$ or the turbine controller allows the wind to speed up the rotor to this rotation speed. If the wind speed then increases further, the rotation speed also increases further, until it has reached the main segment 304 of the rotation speed characteristic curve 300. In this case, said rotation speed has to pass through the critical rotation speed $n_K$, which can lead to undesired loadings. A first characteristic curve segment 311 of a blade setting angle profile 310 is associated with this first characteristic curve segment 301 of the rotation speed characteristic curve. This shows that the blade setting angle which is associated with the first characteristic curve segment 301 of the rotation speed characteristic curve 300 remains constant over the entire wind speed under consideration. This is marked by way of example there by a rotor blade setting angle of 4 degrees.

According to a second characteristic curve segment 302 of the rotation speed characteristic curve 300, it is proposed to immediately increase the rotation speed to a starting rotation speed $n_{ST}$ when the minimum wind speed $V_m$ is reached. This starting rotation speed $n_{ST}$ of the second characteristic curve segment 302 lies above the critical rotation speed $n_K$. Although the second characteristic curve segment 302 also intersects the critical rotation speed $n_K$, it does not have a stationary operating point at this critical rotation speed $n_K$. In this respect, said second characteristic curve segment differs from the first characteristic curve segment 301 which has a critical operating point 321 which forms a stationary operating point. A tower natural frequency is excited at this stationary operating point, specifically the critical operating point 321, this leading to undesired loading.

A blade setting angle according to the second characteristic curve segment 312 of the blade setting angle profile 310 is associated with the second characteristic curve segment 302, which blade setting angle initially, that is to say at low wind speeds $V_W$, has a greater value than the main segment 314 of the blade setting angle profile 310. This angle of the second characteristic curve segment 312 is initially indicated by 6 degrees by way of example here. As the wind speed increases, this blade setting angle initially remains constant but then drops to the value of the main segment 314. At this point, the second characteristic curve segment 302 of the rotation speed characteristic curve 300 then also reaches the main segment 304 of the rotation speed characteristic curve 300.

The situation is also very similar for the third characteristic curve segment 303 of the rotation speed characteristic curve 300 which reaches an even higher starting rotation speed $n_{ST}$ when the minimum wind speed $V_m$ is reached, and therefore assumes an even greater distance from the critical rotation speed $n_K$ likewise right at the beginning. The third characteristic curve segment 303 also intersects the critical rotation speed $n_K$, but does not have a stationary operating point there. The third characteristic curve segment 303 of the rotation speed characteristic curve 300 then also approaches the main segment 304 of the rotation speed characteristic curve 300 as the wind speed $V_W$ increases. When it reaches this main segment 304, it then also has the same rotor blade setting angle as the main segment 314 of the blade setting angle profile 310. However, a third characteristic curve segment 313 of the blade setting angle profile 310 can be seen in front of it, said third characteristic curve segment being associated with the third characteristic curve segment 303 of the rotation speed characteristic curve 300 and exhibiting an even greater blade setting angle there, which blade setting angle is indicated by the value of approximately 8 degrees by way of example.

FIG. 3 is intended to particularly illustrate that a starting rotation speed $n_{ST}$ which is selected to be considerably higher, as is also shown in FIG. 2, does not mean that the wind turbine starts later depending on the wind speed, but rather only that it starts in a different way. Although slight differences in the minimum wind speed $V_m$, at which these different characteristic curves start, are taken into consideration, these differences are small and therefore only a minimum wind speed $V_m$ is marked in FIG. 3 too.

Figure 4:
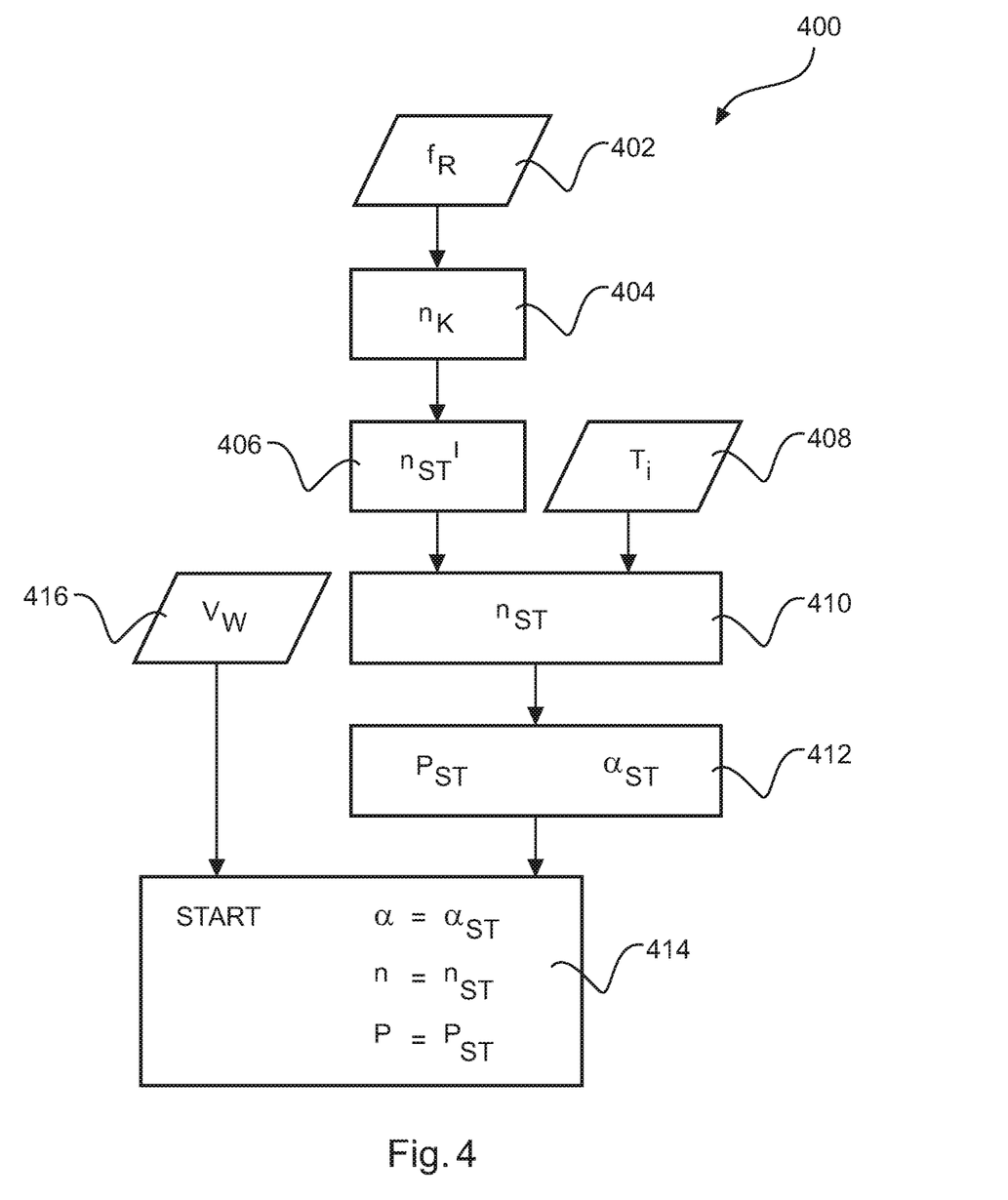
FIG. 4 shows a schematic flow chart of a wind turbine controller or a corresponding method.

FIG. 4 now shows a flow diagram according to which this flow chart 400 starts with the identification block 402. In the identification block 402, the resonant frequency $f_R$ is initially detected or identified. This can be done by way of this resonant frequency being ascertained on the basis of knowledge about the wind turbine. This can also mean that it is already prespecified at the development end and is implemented in a process computer. In this respect, the flow chart 400 is also understood to be a controller in which the flow chart outlined is implemented. This resonant frequency $f_R$ can also be stored in this controller by the manufacturer and as a result form an input variable in this flow chart 400.

The critical rotation speed $n_K$ is calculated from this resonant frequency or natural frequency of the tower of the wind turbine in the calculation block 404 in any case. As a calculation for this, consideration is given to it being assumed that the critical rotation speed $n_K$ corresponds to the rotation speed which has a blade pass frequency which corresponds to the natural frequency or resonant frequency $f_R$.

Based on this critical rotation speed $n_K$, a starting rotation speed $n_{ST}$ is then calculated in the simplified starting rotation speed block 406. This can be done, for example, by way of said starting rotation speed being set to a value of 5% above the critical rotation speed $n_K$. It is preferably set to a value in the range of from 5 to 25% above the critical rotation speed $n_K$.

It is then proposed to additionally detect a turbulence measure. For this purpose, the turbulence intensity block 408 ascertains a turbulence intensity. This can be done, for example, based on wind speed measurements. Therefore, the turbulence intensity block 408 is also characterized as an input block. From these two values, specifically the simplified starting rotation speed $n_{ST}$ and the turbulence intensity $T_i$, the starting rotation speed $n_{ST}$ is then determined in the complete starting rotation speed block 410.

The starting rotation speed $n_{ST}$ determined in this way is then input into the starting operating point block 412. In the starting operating point block 412, the starting power $P_{ST}$ and the starting rotor blade setting angle $\alpha_{ST}$ are determined from the starting rotation speed $n_{ST}$. These three values, that is to say the starting rotation speed $n_{ST}$, the starting power $P_{ST}$ and the starting rotor blade setting angle $\alpha_{ST}$, then define the operating point to be set. This operating point, that is to say the three values mentioned, is given in the starting block 414. However, starting is implemented only when there is a sufficiently high wind speed $V_W$. This is determined by the wind block 416 and input into the starting block 414. As an alternative, it is proposed that, instead of detecting the wind speed, a torque is used as the basis and starting is then implemented only when, owing to the wind, there is a predetermined starting torque. For this alternative, the wind block 416 can then be in the form of a starting torque block.

In principle, this flow chart 400 is a schematic illustration and all blocks described can also be combined or partially combined, particularly in corresponding software in a process computer. However, it should be noted in particular that the turbulence intensity block 408 and the wind block 416 can share the same data in particular. For example, the wind block 416 can receive the wind speed data, for example, by a corresponding sensor and pass said data firstly into the starting block 414 but secondly also transfer said data to the turbulence intensity block 408 for evaluation purposes.

In any case, according to the starting block 414, the wind turbine is then started when the wind speed, which the wind block 416 has transferred, is sufficiently high. As an alternative, a torque can also be taken into consideration here and can be compared with a predetermined starting torque. The wind turbine is then started and this means, in particular, that the rotor blade setting angle $\alpha$ is then initially set to the starting rotor blade setting angle $\alpha_{ST}$. In addition, the rotor speed n is set to the starting rotation speed $n_{ST}$ and the output power P can also be set to the starting output power $P_{ST}$. These are particular starting conditions which have been determined in the starting operating point block 412.

If the wind speed is further increased, the values can then be adapted however. This can be done, in particular, as is prespecified by corresponding characteristic curves, specifically particularly by a rotation speed characteristic curve as shown in FIG. 2 and a blade setting angle profile as shown in the lower region of FIG. 3. The rotation speed characteristic curve 300 of FIG. 3 serves substantially for illustration purposes, but does not form a characteristic curve which controls the wind turbine. However, the starting wind speed, which is recorded there as the minimum wind speed $V_m$, can preferably be taken into account in the starting block 414.

LIST OF REFERENCE SIGNS

Wind turbine 100
Tower 102
Nacelle 104
Rotor 106
Rotor blades 108
Spinner 110
Power P/Output power P
Nominal power $P_N$
Minimum power $P_m$
Starting power $P_{ST}$/Starting output power $P_{ST}$
Rotation speed n/Rotation speed profile n/Rotor speed n
Starting rotation speed $n_{ST}$
Nominal rotation speed $n_N$
Critical rotation speed $n_K$
Minimum rotation speed $n_m$
Operating characteristic curve 200
First characteristic curve segment 201
Second characteristic curve segment 202
Third characteristic curve segment 203
Main segment 204
Wind speed $V_W$
Nominal wind speed $V_N$
Low wind speed/Minimum wind speed $V_m$
Blade setting angle $\alpha$
Starting rotor blade setting angle $\alpha_{ST}$
Rotation speed characteristic curve 300
First characteristic curve segment 301
Second characteristic curve segment 302
Third characteristic curve segment 303
Main segment 304
Blade setting angle profile 310
First characteristic curve segment 311
Second characteristic curve segment 312
Third characteristic curve segment 313
Main segment 314
Critical operating point 321
Flow chart 400
Identification block 402
Resonant frequency $f_R$
Calculation block 404
Simplified starting rotation speed block 406
Simplified starting rotation speed $n_{ST}$
Turbulence intensity block 408
Turbulence intensity $T_i$
Complete starting rotation speed block 410
Starting operating point block 412
Starting block 414
Wind block 416

The invention claimed is:

1. A wind turbine, comprising:
 a tower;
 an aerodynamic rotor operable at a variable rotor speed and having a plurality of rotor blades, each blade having an adjustable rotor blade setting angle;
 a generator configured to generate an electrical output power during a power supplying operation, wherein an operating characteristic curve is prespecified for operating the wind turbine and the operating characteristic curve defines a relationship between the rotor speed and the output power; and a controller configured to set the output power to a value of the operating characteristic curve corresponding to a value of the rotor speed, wherein:

the operating characteristic curve has a starting rotation speed to which the rotor speed increases in response to both the wind turbine starting and a sufficient wind speed being reached, the starting rotation speed corresponding to a rotor speed at which the generator is controlled to start generating the output power, and the starting rotation speed is determined, prior to the power supplying operation, depending on a tower natural frequency of the wind turbine.

2. The wind turbine as claimed in claim 1, wherein:

the operating characteristic curve specifies a starting output power value associated with the starting rotation speed, and the controller is configured to set the output power to the starting output power value in response to the wind turbine starting, the starting output power value being generated by the generator until the sufficient wind speed is exceeded.

3. The wind turbine as claimed in claim 2, wherein when either a wind speed increases to the sufficient wind speed or a rotor torque increases to a starting torque, the rotor speed increases to the starting rotation speed, the controller sets the starting output power value and the generator generates the starting output power value.

4. The wind turbine as claimed in claim 1, wherein the operating characteristic curve is selected from a plurality of predetermined operating characteristic curves.

5. The wind turbine as claimed in claim 1, wherein a starting rotor blade setting angle is associated with the starting rotation speed, and wherein the starting rotation speed is positively correlated with the starting rotor blade setting angle such that the starting rotation speed increases as the starting rotor blade setting angle increases and the starting rotation speed decreases as the starting rotor blade setting angle decreases.

6. The wind turbine as claimed in claim 1, wherein:

the controller is configured to select a tip-speed ratio for the starting rotation speed depending on the starting rotation speed or depending on a starting rotor blade setting angle, the controller being configured to select the tip-speed ratio for the starting rotation speed such that:

the starting rotation speed is positively correlated with the tip-speed ratio such that the tip-speed ratio increases as the starting rotation speed increases and the tip-speed ratio decreases as the starting rotation speed decreases, and the starting rotor blade setting angle is positively correlated with the tip-speed ratio such that the tip-speed ratio increases as the starting rotor blade setting angle increases and the tip-speed ratio decreases as the starting rotor blade setting angle decreases.

7. The wind turbine as claimed in claim 1, wherein the starting rotation speed is also determined depending on a turbulence intensity of winds acting on the wind turbine over a period of time, the turbulence intensity being determined based on respective wind speeds of the winds.

8. The wind turbine as claimed in claim 7, wherein:

the turbulence intensity is positively correlated with a variation in the wind speeds during the period of time such that the turbulence intensity increases as the variation increases and the turbulence intensity decreases as the variation decreases, and the turbulence intensity is positively correlated with the starting rotation speed such that the starting rotation speed increases as the turbulence intensity increases and the starting rotation speed decreases as the turbulence intensity decreases.

9. The wind turbine as claimed in claim 7, wherein the starting rotation speed is selected such that the starting rotation speed is greater than a rotor speed which excites the tower natural frequency.

10. The wind turbine as claimed in claim 9, wherein:

the starting rotation speed is selected such that a blade pass frequency is greater than the tower natural frequency, the blade pass frequency being a frequency at which the plurality of rotor blades pass by a specified point during rotation of the plurality of rotor blades.

11. The wind turbine as claimed in claim 10, wherein the blade pass frequency is between 5% and 25% above the tower natural frequency.

12. The wind turbine as claimed in claim 10, wherein the blade pass frequency is at least 5% above the tower natural frequency.

13. The wind turbine as claimed in claim 7, wherein:

the rotor speed is adjusted depending on the turbulence intensity to set the starting rotation speed.

14. The wind turbine as claimed in claim 13, wherein the rotor rotates in a coasting mode in which the generator does not generate the output power.

15. The wind turbine as claimed in claim 7, wherein the wind speeds of the winds acting on the wind turbine over the period of time are determined indirectly from an operating behavior of the wind turbine, the operating behavior including the rotor speed, a rotor torque, the output power or the rotor blade setting angles of the plurality of blades of the wind turbine.

16. A method for controlling a wind turbine, wherein the wind turbine includes:

a tower, an aerodynamic rotor operable at a rotor speed that is variable and having a plurality of rotor blades, each blade having an adjustable rotor blade setting angle, and a generator configured to generate an output power, and the method comprises:

during a power supplying operation, operating the wind turbine using a prespecified operating characteristic curve which defines a relationship between the rotor speed and the output power;

setting the output power to a value of the operating characteristic curve corresponding to a value of the rotor speed, wherein the operating characteristic curve has a starting rotation speed, the starting rotation speed corresponding to a rotor speed at which the generator is controlled to start generating the output power;

determining, prior to the power supplying operation, the starting rotation speed depending on a tower natural frequency of the wind turbine; and in response to both the wind turbine starting, by allowing rotation of the rotor, and a sufficient wind speed being reached, increasing the rotor speed to the starting rotation speed.

17. The method as claimed in claim 16, wherein a starting output power value is generated by the generator until the sufficient wind speed is exceeded.

18. The method as claimed in claim 16, wherein a starting rotor blade setting angle is associated with the starting rotation speed and the starting rotation speed is positively correlated with the starting rotor blade setting angle such that the starting rotation speed increases as the starting rotor blade setting angle increases and the starting rotation speed decreases as the starting rotor blade setting angle decreases.

19. The method as claimed in claim 16, wherein the starting rotation speed is determined also depending on a turbulence intensity of winds acting on the wind turbine over a period of time, the turbulence intensity being determined based on respective wind speeds of the winds.

20. The method as claimed in claim 19, wherein:
the turbulence intensity is positively correlated with the starting rotation speed such that the starting rotation speed increases as the turbulence intensity increases and the starting rotation speed decreases as the turbulence intensity decreases.

\* \* \* \* \*